US012677995B1

(12) United States Patent (10) Patent No.: US 12,677,995 B1
Hu et al. (45) Date of Patent: Jul. 14, 2026

(54) FOLDABLE GRIPPING STRUCTURE FOR COOKING UTENSILS

(71) Applicant: Zhejiang Novia Kitchenware Co., Ltd., Jinhua City (CN)

(72) Inventors: Huacheng Hu, Jinhua City (CN); Chengzhou Zhang, Jinhua City (CN); Jinzhi Ye, Jinhua City (CN)

(73) Assignee: Zhejiang Novia Kitchenware Co., Ltd., Jinhua City (CN)

( * ) Notice: Subject to any disclaimer, the term of this patent is extended or adjusted under 35 U.S.C. 154(b) by 0 days.

(21) Appl. No.: 19/340,622

(22) Filed: Sep. 25, 2025

(30) Foreign Application Priority Data

Aug. 25, 2025 (CN) .......................... 202511188737.5
Aug. 25, 2025 (CN) .......................... 202521804975.X

(51) Int. Cl.
*A47J 45/06* (2006.01)
(52) U.S. Cl.
CPC .................................... *A47J 45/061* (2013.01)
(58) Field of Classification Search
CPC .......... A47J 45/00; A47J 45/06; A47J 45/061; A47J 45/067
USPC ......................................................... 220/752
See application file for complete search history.

(56) References Cited

U.S. PATENT DOCUMENTS 6,076,233 A * 6/2000 Sasaki .................... B60N 3/026
16/444
8,267,277 B2 * 9/2012 Chameroy ............ A47J 45/062
220/763
8,322,564 B2 * 12/2012 Magnouloux ......... A47J 45/062
220/759
2022/0160179 A1 * 5/2022 Kim ........................ A47J 47/16

FOREIGN PATENT DOCUMENTS

| CN | 206473166 U | | 9/2017 | | |
|----|-------------|---|--------|---|---|
| CN | 112274035 A | * | 1/2021 | .............. | A47J 45/06 |
| CN | 216020679 U | * | 3/2022 | .............. | A47J 45/06 |
| JP | 2796485 B2 | * | 9/1998 | .............. | A47J 45/06 |
| KR | 200398081 Y1 | * | 10/2005 | ........... | A47J 45/065 |
| KR | 20130020228 A | * | 2/2013 | ........... | A47J 45/062 |

OTHER PUBLICATIONS

English translation of KR 200398081 Y1 (Year: 2005).*

* cited by examiner

*Primary Examiner* — Stephen J Castellano
*Assistant Examiner* — Eric C Baldrighi
(74) *Attorney, Agent, or Firm* — Mei & Mark LLP; Manni Li

(57) ABSTRACT

A foldable gripping structure for cooking utensils comprises a fixed component and a gripping component, where the gripping component is rotatably connected to the fixed component, and the gripping component rotates to a retracted position relative to the fixed component to achieve a folded state or rotates to a working position to achieve an unfolded state. The fixed component comprises a mounting base and a pivot tube. A rotating shaft is disposed in the pivot tube, and two pivot arms of the gripping component are connected to both ends of the rotating shaft. The gripping component folds or unfolds relative to the fixed component around the rotating shaft. A locking/unlocking assembly capable of fixing the gripping component in the working position and unlocking the gripping component from the working position is further arranged at the pivot tube. The foldable gripping structure is suitable for heavy cooking utensils.

8 Claims, 4 Drawing Sheets

FOLDABLE GRIPPING STRUCTURE FOR COOKING UTENSILS

CROSS-REFERENCE TO RELATED APPLICATIONS

The subject application claims priority on Chinese Patent Application Nos. CN202511188737.5 and CN202521804975.X, both filed on Aug. 25, 2025 in China. The contents and subject matters of the Chinese priority applications are incorporated herein by reference.

TECHNICAL FIELD

The present invention relates to the technical field of accessories for cooking utensils and similar pots, cookers or containers, and in particular to a foldable gripping structure for cooking utensils.

BACKGROUND ART

A cooking utensil such as a pot mainly comprises a pot body, a connecting base disposed on the pot body, and a handle or a lifting handle disposed on the connecting base, where the handle or the lifting handle is typically fixed on the connecting base by means of bolts or other means, and the connecting base is typically connected to the pot body in a welded or fixed manner, which occupies a large space and causes inconvenience in carrying, placing, and packaging. To facilitate placement and portability when not in use, the handle or the lifting handle is designed to be detachable. However, troublesome installation for use and disassembly for placement each time bring much inconvenience to daily life of the user. In particular, a handle or a lifting handle of a larger cooking utensil such as a stockpot is usually relatively large and firmly connected to the cooking utensil, resulting in that disassembly is inconvenient.

Chinese patent CN206473166U discloses a pot with a rotatable handle, the pot comprises a pot body and a handle base disposed on one side of the pot body, a pot handle is disposed on the handle base, the handle base is provided with a fixed platform, a rotating hole is formed at one end of the pot handle and rotatably matched with the fixed platform, a limiting structure is disposed between the fixed platform and the pot handle, a recess is formed on the fixed platform, a button is disposed in the recess, a snap-fit block is connected below the button, a spring is disposed below the snap-fit block, a first snap-fit groove matched with the snap-fit block is further formed in the recess, and a second snap-fit groove matched with the snap-fit block is disposed in the rotating hole of the pot handle; when the pot handle rotates and the second snap-fit groove coincides with the first snap-fit groove, the snap-fit block enters the second snap-fit groove, and the pot handle is unfolded and fixed in a hand-holdable working state; when the button is pressed, the snap-fit block disengages from the second snap-fit groove, and the pot handle rotates toward an upper surface of the pot body; a locking block is disposed at the other end of the pot handle, a locking groove is formed on an outer peripheral wall of the pot body, and when the pot handle rotates to a pot surface, the locking block is inserted into the locking groove, and the pot handle is retracted on the pot surface.

The technical scheme achieves retraction of the pot handle on the pot surface without disassembly, and solves the problem that the fixed pot handle occupies a large space. However, the structure in which the pot handle is higher than the pot surface poses a challenge to the user's cooking habits. Additionally, the pot handle structure is particularly unsuitable for larger cooking utensils such as stockpots.

SUMMARY OF THE INVENTION

An objective of the present invention is to provide a foldable gripping structure for cooking utensils, which overcomes the drawbacks of foldable handles in the existing technology including excessive requirements on material strength, operation inconvenience, and easy wobbling during use, particularly including unsuitability for heavy cooking utensils such as stockpots.

In order to achieve the above objective, the present invention provides a technical solution as follows:

A foldable gripping structure for cooking utensils, comprising a fixed component and a gripping component, where the gripping component is rotatably connected to the fixed component, the gripping component rotates to a retracted position relative to the fixed component to achieve a folded state, and the gripping component rotates to a working position relative to the fixed component to achieve an unfolded state;

the fixed component comprises a mounting base and a pivot tube connected to the mounting base; the gripping component comprises two pivot arms, a pivot head is disposed at a top end of each of the pivot arms, and the pivot head is provided with a pivot hole; the two pivot heads are located at both ends of the pivot tube respectively; a rotating shaft is disposed in the pivot tube, and both ends of the rotating shaft are connected to the two pivot heads of the gripping component through the two pivot holes respectively;

the gripping component folds or unfolds relative to the fixed component around the rotating shaft; and a locking/unlocking assembly configured to at least lock the gripping component in the working position or unlock same from the working position is disposed at an end of the pivot tube.

A locking/unlocking assembly configured to lock the gripping component in the working position, lock same in the retracted position, or unlock same from the above two positions is disposed at an end of the pivot tube.

The locking/unlocking assembly is disposed at one end of the pivot tube, or the locking/unlocking assembly is disposed at both ends of the pivot tube.

The locking/unlocking assembly comprises a push block, a sleeve, an elastic member, and a connecting plate connecting the push block and the sleeve; an end portion of the pivot tube is provided with a sliding groove configured to guide the sliding of the connecting plate; the sleeve is disposed in the pivot tube and sleeved on the rotating shaft; a blocking member is disposed on an inner wall of the pivot tube or on the rotating shaft, the elastic member is compressed between the blocking member and the sleeve, one end of the elastic member abuts against the blocking member, and the other end thereof abuts against the sleeve;

the rotating shaft comprises end portions at both ends thereof and a shaft rod between the two end portions; when the locking/unlocking assembly is disposed at one end of the pivot tube, the end portion of the rotating shaft at the end where the locking/unlocking assembly is located is configured to be flattened or shaped like a regular polygon; or when the locking/unlocking assembly is disposed at both ends of the pivot tube, both end portions of the rotating shaft are configured to be flattened or shaped like a regular polygon; and a shape of the tube hole thereof is consistent with a shape of the end portion of the rotating shaft; when the sleeve is sleeved onto the end portion of the rotating shaft under the action of the elastic member, the gripping component is locked in the working position, and when the sleeve retracts from the end portion of the rotating shaft against the action of the elastic member, the gripping component is unlocked from the working position.

A small circular rod is disposed between the end portion and the shaft rod of the rotating shaft; a diameter of an inscribed circle of the sleeve of the locking/unlocking assembly is larger than a diameter of the small circular rod and smaller than a diameter of the shaft rod; and the gripping component rotates only when the sleeve retracts from the end portion of the rotating shaft and moves to the small circular rod.

A shape of the pivot hole of the pivot arm is consistent with the shape of the end portion of the rotating shaft, and the rotating shaft is fixedly connected to the pivot arm through the corresponding end portion, and rotates with the rotation of the gripping component; and when the gripping component rotates to the working position, the sleeve of the locking/unlocking assembly is sleeved onto the end portion of the rotating shaft under the action of the elastic member, and the gripping component is locked in the working position.

The end portion of the rotating shaft is shaped like a regular polygon with edges and corners.

The elastic member is a spring; and the fixed component, the gripping component, and the locking/unlocking assembly are all made of a metal material.

Limiting blocks that protrude outward from end faces thereof are disposed at both ends of the pivot tube; correspondingly, the pivot head of either of the pivot arms is provided with a recessed limiting sliding groove, and when the pivot arms are connected to the rotating shaft, the limiting blocks are located in the limiting sliding grooves; and when the gripping component rotates between the working position and the retracted position, the limiting blocks slide relatively in the limiting sliding grooves, and when the gripping component rotates to the working position, the limiting blocks abut against edges of the limiting sliding grooves to prevent further rotation of the gripping component.

The limiting block is disposed at a lower portion of the pivot tube, and the limiting sliding groove is correspondingly formed at a lower half portion of the pivot head when the gripping component is in the working position.

The advantages of the present invention are as follows: first, the end portions of the rotating shaft are configured to be flattened or shaped like a regular polygon, and the pivot holes are correspondingly configured, such that the end portion thereof and the pivot hole are firmly connected without slipping, thereby ensuring that the rotating shaft rotates with the rotation of the gripping component; second, the design that the shape of the tube hole of the sleeve is consistent with the shape of the end portion of the rotating shaft is simple, effective, and low-cost, and after the sleeve is sleeved onto the end portion, snap-fitted connection is firm without slipping; and the position accuracy is ensured, and easy loosening between components is prevented; and third, the design of the limiting blocks and the limiting sliding grooves further enhances the firmness and operational safety of the entire handle, such that the handle bears a greater load.

Figure 1:
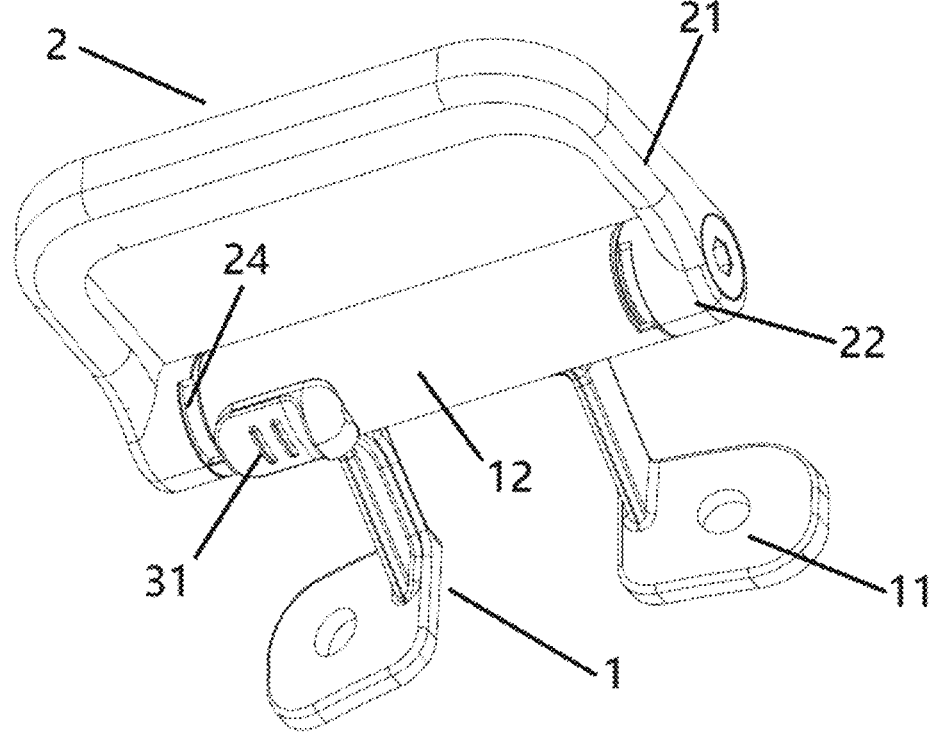
FIG. 1 is a schematic structural diagram of the present invention.

Reference numerals in the figures refer to the following structures: 1—fixed component; 11—mounting base; 12—pivot tube; 13—sliding groove; 14—limiting block; 2—gripping component; 21—pivot arm; 22—pivot head; 23—pivot hole; 24—limiting sliding groove; 31—push block; 32—sleeve; 33—connecting plate; 34—elastic member; 4—rotating shaft; 41—end portion; 42—shaft rod; 43—small circular rod; and 5—cooking utensil.

DETAILED DESCRIPTION OF THE INVENTION

The present invention is further described below with reference to the accompanying drawings. The accompanying drawings are for illustrative description only, and may not be construed as limiting the present invention.

In order to explain this embodiment more concisely, some parts and components that are well known to those skilled in the art but are not relevant to the main content of the present invention might be omitted in the accompanying drawings or descriptions. In addition, for the convenience of description, some parts and components in the accompanying drawings may be omitted, enlarged or downsized, but this does not represent the size or entire structure of an actual product.

Figure 7:
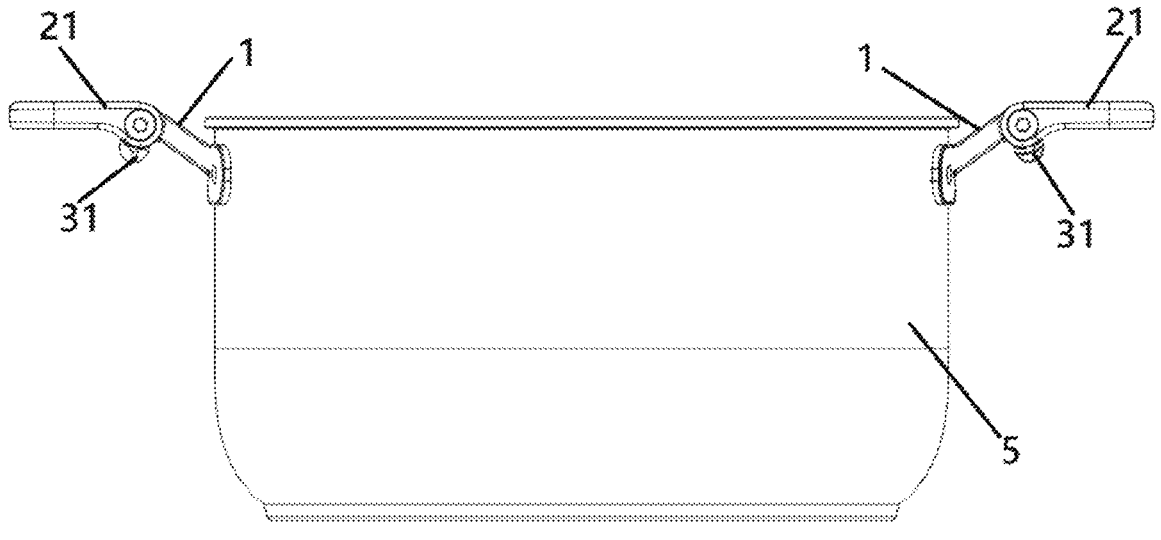
FIG. 7 is a schematic diagram of a gripping structure of a cooking utensil of the present invention in a working position.
Figure 8:
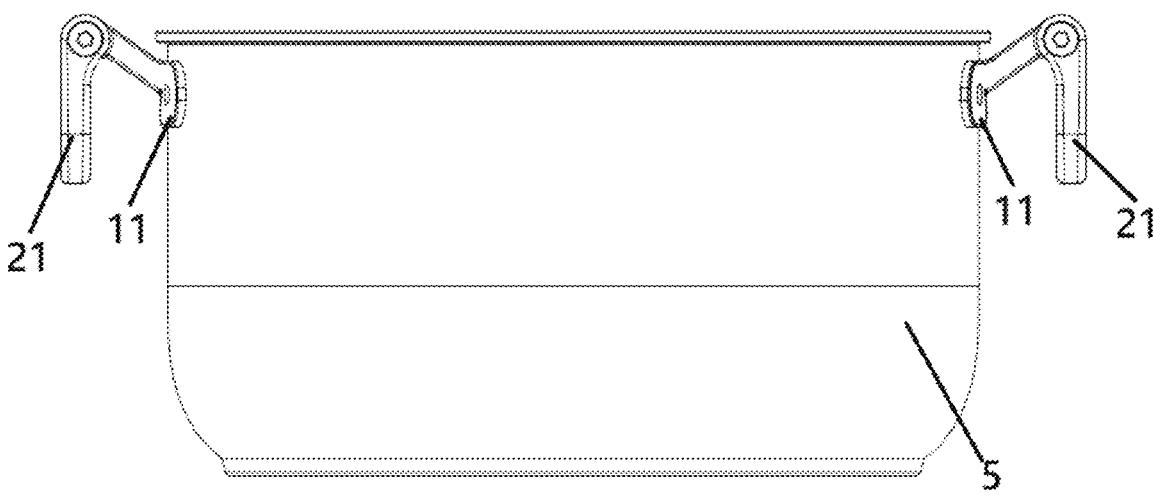
FIG. 8 is a schematic diagram of a gripping structure of a cooking utensil of the present invention in a retracted position.

A foldable gripping structure for cooking utensils is disclosed by the present invention, and as shown in FIGS. 1 to 6, comprises a fixed component 1 and a gripping component 2, where the gripping component 2 is rotatably connected to the fixed component 1, and the fixed component 1 is connected to a cooking utensil 5 through a mounting base 11. As shown in FIG. 8, the gripping component 2 rotates to a retracted position relative to the fixed component 1 to achieve a folded state, and as shown in FIG. 7, the gripping component 2 rotates to a working position relative to the fixed component 1 to achieve an unfolded state.

Figure 2:
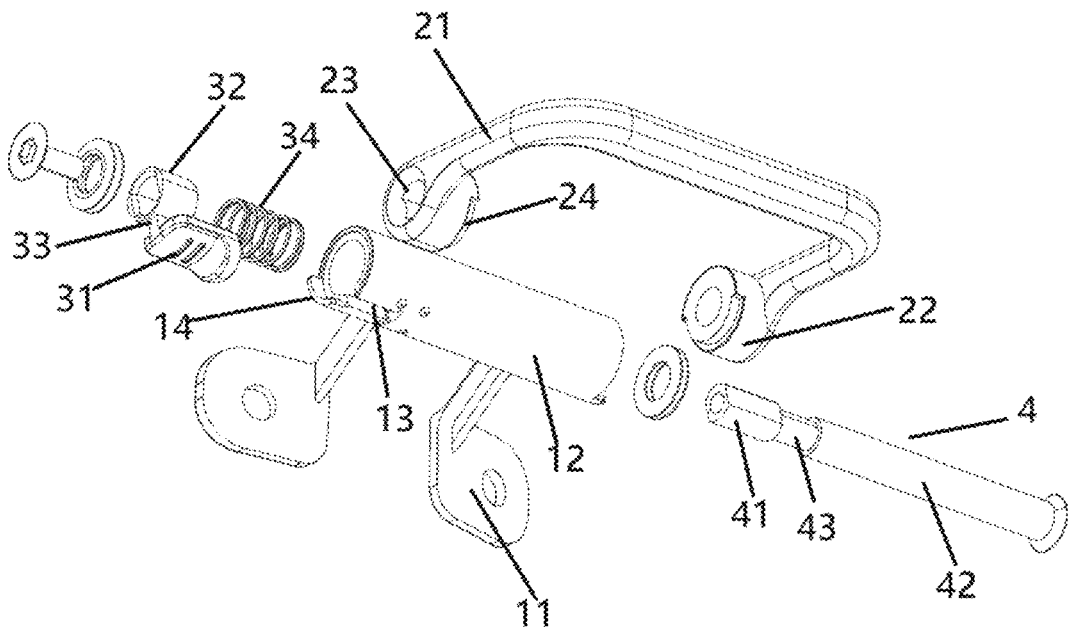
FIG. 2 is an exploded view of a structure of the present invention.

As shown in FIGS. 1 and 2, the fixed component 1 comprises the mounting base 11 and a pivot tube 12 connected to the mounting base 11; the gripping component 2 comprises two pivot arms 21, a pivot head 22 is disposed at a top end of each of the pivot arms 21, and the pivot head 22 is provided with a pivot hole 23; the two pivot heads 22 are located at both ends of the pivot tube 12 respectively; a rotating shaft 4 is disposed in the pivot tube 12, and both ends of the rotating shaft 4 are connected to the two pivot heads 22 of the gripping component 2 through the two pivot holes 23 respectively; and the gripping component 2 folds or unfolds relative to the fixed component 1 around the rotating shaft 4.

A locking/unlocking assembly configured to at least lock the gripping component 2 in the working position or unlock same from the working position is disposed at an end of the pivot tube 12.

Further, depending on use scenarios, a locking/unlocking assembly configured to lock the gripping component 2 in the working position, lock same in the retracted position, or unlock same from the above two positions is disposed at an end of the pivot tube 12.

Figure 6:
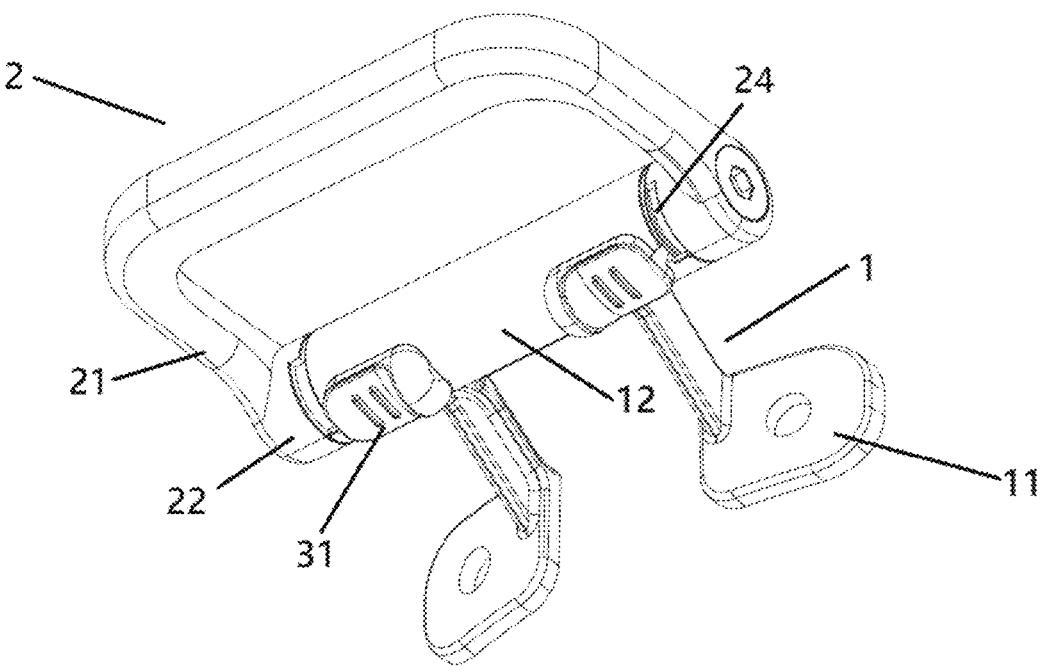
FIG. 6 is a schematic structural diagram of another embodiment of the present invention.

As shown in FIG. 1, the locking/unlocking assembly may be disposed at one end of the pivot tube 12, or as shown in FIG. 6, the locking/unlocking assembly may be disposed at both ends of the pivot tube 12.

As shown in FIGS. 2 to 5, the locking/unlocking assembly comprises a push block 31, a hollow sleeve 32, an elastic member 34, and a connecting plate 33 connecting the push block 31 and the sleeve 32, where the connecting plate 33 is sheet-shaped; an end portion of the pivot tube 12 is provided with a sliding groove 13 configured to guide the sliding of the connecting plate 33; the sleeve 32 is disposed in the pivot tube 12 and sleeved on the rotating shaft 4; a blocking member is disposed on an inner wall of the pivot tube 12 or on the rotating shaft 4, the elastic member 34 is compressed between the blocking member and the sleeve 32, one end of the elastic member 34 abuts against the blocking member, and the other end thereof abuts against the sleeve 32; and the elastic member 34 keeps the sleeve 32 always tending to pop outward. Preferably, the blocking member is disposed on the inner wall of the pivot tube 12, and the elastic member 34 is typically a spring.

The rotating shaft 4 comprises end portions 41 at both ends thereof and a shaft rod 42 between the two end portions 41.

The configuration of the rotating shaft 4 is situation-dependent, and as shown in FIG. 2, when the locking/unlocking assembly is disposed at one end of the pivot tube 12, the end portion 41 of the rotating shaft 4 at the end where the locking/unlocking assembly is located is configured to be flattened or shaped like a regular polygon; and preferably, the end portion 41 is configured to be flattened or shaped like a regular polygon with edges and corners.

Alternatively, as shown in FIG. 6, when the locking/unlocking assembly is disposed at both ends of the pivot tube 12, both end portions 41 of the rotating shaft 4 are configured to be flattened or shaped like a regular polygon.

When the end portion 41 of the rotating shaft 4 is configured to be shaped like a regular polygon, the gripping component 2 may be locked in a plurality of positions, that is, the gripping component may be locked at a plurality of positions between the working position and the retracted position, depending on the number of sides of the polygon selected.

A tube hole of the sleeve 32 is matched with the end portion 41 of the rotating shaft 4, that is, a shape of the tube hole thereof is consistent with a shape of the end portion 41 of the rotating shaft 4, such that when the sleeve 32 is sleeved onto the end portion 41, a tight fit is formed therebetween, thereby preventing slipping or relative rotation; especially when the end portion 41 is shaped like a regular polygon with edges and corners, the sleeve and the end portion are snap-fitted with achieve other very tightly;

and when the sleeve 32 is sleeved onto the end portion 41 of the rotating shaft 4 under the action of the elastic member 34, the gripping component 2 is locked in the working position, and when the sleeve 32 retracts from the end portion 41 of the rotating shaft 4 against the action of the elastic member 34, the gripping component 2 is unlocked from the working position and rotates from the working position to the retracted position.

Further, a shape of the pivot hole 23 of the pivot arm 21 is consistent with the shape of the end portion 41 of the rotating shaft 4, such that after the rotating shaft 4 is fixedly connected to the pivot arm 21 through the corresponding end portion 41, it is ensured that the rotating shaft 4 only rotates with the rotation of the gripping component 2.

The locking/unlocking assembly is disposed at the pivot tube 12, the sleeve 32 is disposed in the pivot tube 12, and the connecting plate 33 is disposed in the sliding groove 13, such that the sleeve 32 cannot rotate; when the gripping component 2 rotates and drives the rotating shaft 4 to rotate to the working position, the tube hole of the sleeve 32 of the locking/unlocking assembly is aligned with the end portion 41 of the rotating shaft 4, the blocking of the rotating shaft 4 against the sleeve 32 disappears, and the sleeve 32 is sleeved onto the end portion 41 of the rotating shaft 4 under the action of an elastic force of the elastic member 34; and since the connecting plate 33 of the locking/unlocking assembly is still located in the sliding groove 13 of the pivot tube 12, the sleeve 32 clamps the rotating shaft 4 to prevent rotation, thereby locking the gripping component 2 in the working position.

To rotate the gripping component 2 to the retracted position, it is only necessary to drive the push block 31 to move toward the pivot tube 12 against the elastic force of the elastic member 34, and then retract the sleeve 32 from the end portion 41 of the rotating shaft 4, such that the gripping component 2 is unlocked and rotates from the working position to the retracted position.

Figure 3:
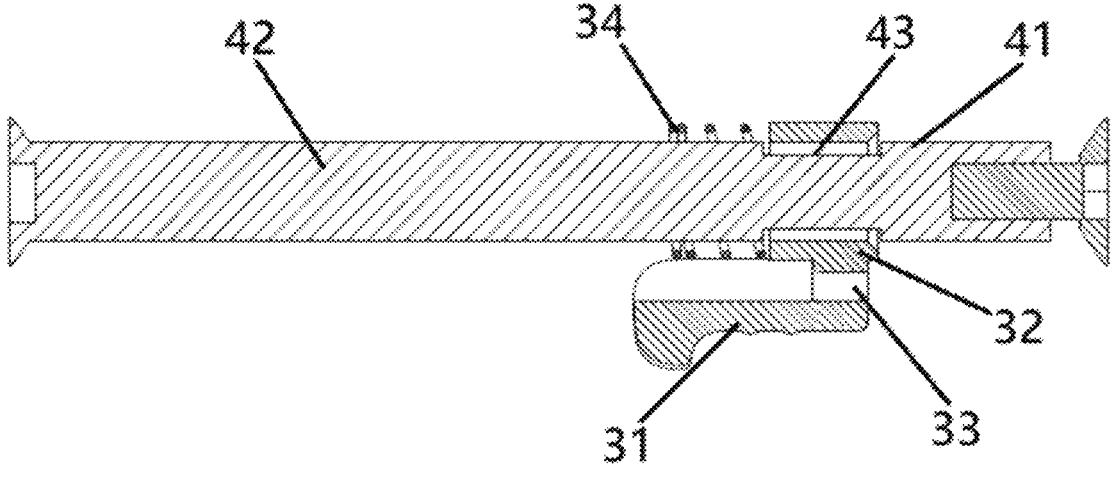
FIG. 3 is a sectional view of connection between a locking/unlocking assembly and a rotating shaft of the present invention.
Figure 4:
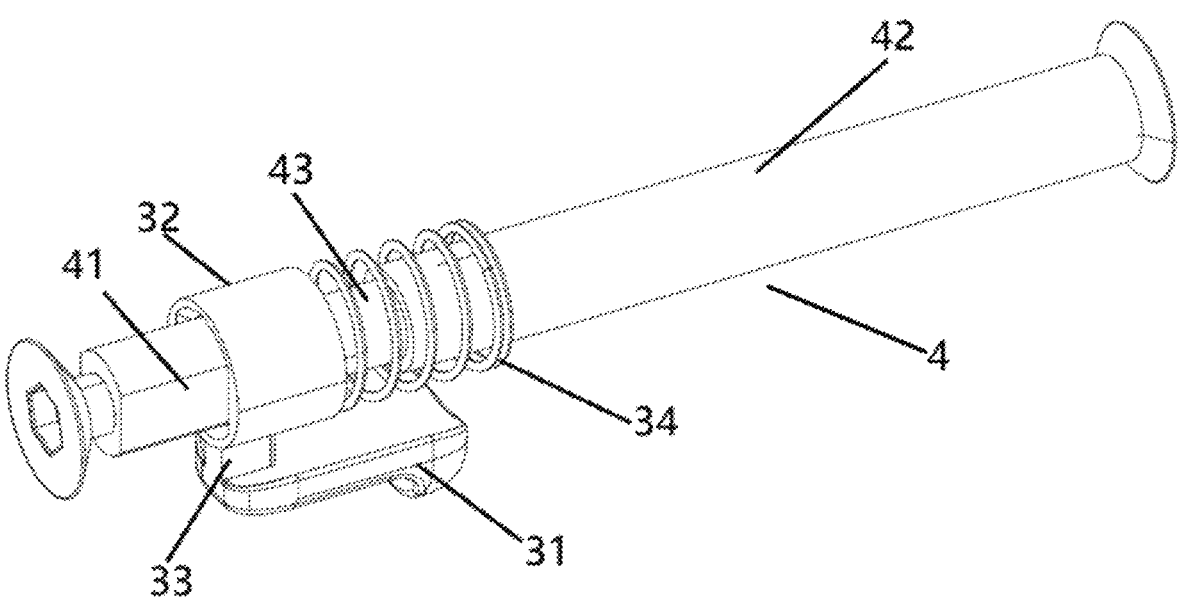
FIG. 4 is a schematic structural diagram of a sleeve sleeved onto an end portion of a rotating shaft of the present invention in a locked state.
Figure 5:
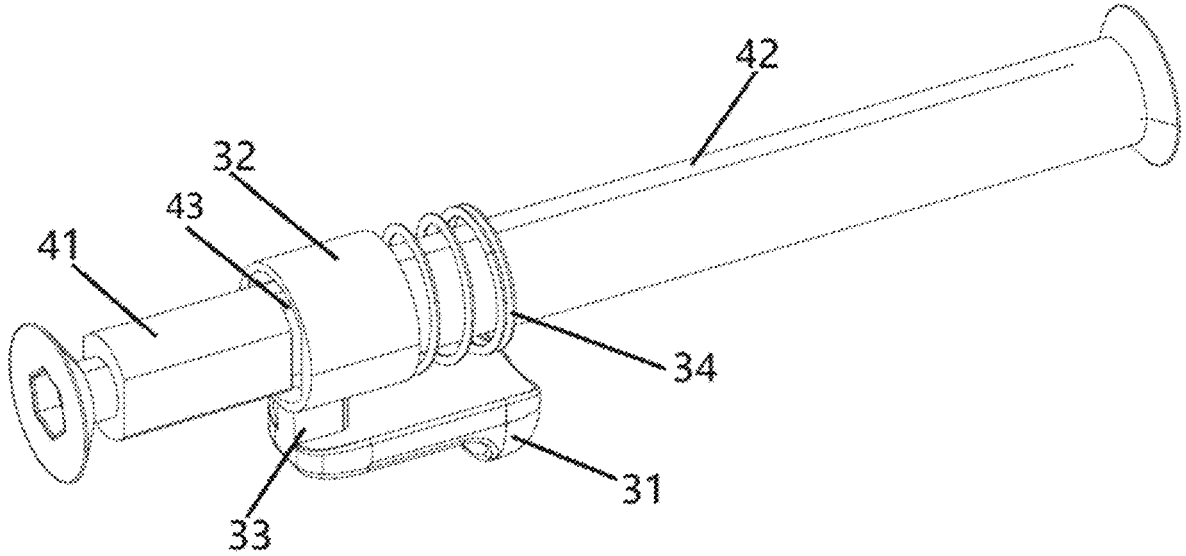
FIG. 5 is a schematic structural diagram of a sleeve retracted from an end portion of a rotating shaft of the present invention.

Preferably, as shown in FIGS. 3 to 5, a small circular rod 43 is disposed between the end portion 41 and the shaft rod 42 of the rotating shaft 4; a diameter of an inscribed circle of the sleeve 32 of the locking/unlocking assembly is larger than a diameter of the small circular rod 43 and smaller than a diameter of the shaft rod 42, such that the sleeve 32 only moves between the small circular rod 43 and the end portion 41; and additionally, the gripping component 2 drives the rotating shaft 4 to rotate only when the sleeve 32 retracts from the end portion 41 of the rotating shaft 4 and moves to the small circular rod 43.

To enhance firmness and stability of the gripping component 2 in the working position, as shown in FIG. 2, limiting blocks 14 that protrude outward from end faces thereof are disposed at both ends of the pivot tube 12; correspondingly, the pivot head 22 of either of the pivot arms 21 is provided with a recessed limiting sliding groove 24, and when the pivot arms 21 are connected to the rotating shaft 4, the limiting blocks 14 are inserted into the limiting sliding grooves 24; when the gripping component 2 rotates between the working position and the retracted position, the limiting blocks 14 slide relatively in the limiting sliding grooves 24, and when the gripping component 2 rotates to the working position, the limiting blocks 14 abut against edges of the limiting sliding grooves 24 to prevent further rotation of the gripping component 2; and the limiting blocks 14, the connecting plate 33, and the sliding groove 13 jointly maintain the firmness and stability of the gripping component 2 in the working position.

Preferably, the limiting block 14 is disposed at a lower portion of the pivot tube 12, and the limiting sliding groove 24 is correspondingly formed at a lower half portion of the pivot head 22 when the gripping component 2 is in the working position.

To ensure the firmness of each component and safety during use, the fixed component 1, the gripping component 2, and the locking/unlocking assembly are all made of a metal material.

The foregoing descriptions are merely preferred embodiments of the present invention, and are not intended to limit the scope of protection of the present invention. That is to say, all equivalent changes and modifications made based on the contents of the patentable scope of the present invention shall fall within the technical scope of the present invention.

We claim:

1. A foldable gripping structure for cooking utensils, comprising a fixed component (1), wherein the fixed component (1) comprises a mounting base (11) and a pivot tube (12) connected to the mounting base (11), and the pivot tube (12) comprises two ends, and a gripping component (2) being rotatably connected to the fixed component (1), wherein the gripping component (2) comprises two pivot arms (21), each of the two pivot arm (21) comprises an end disposed with a pivot head (22), and each of the two pivot heads (22) is provided with a pivot hole (23), wherein the gripping component (2) rotates to a retracted position relative to the fixed component (1) to achieve a folded state and rotates to a working position relative to the fixed component (1) to achieve an unfolded state;

the two pivot heads (22) are respectively located at the two ends of the pivot tube (12);

a rotating shaft (4) is disposed in the pivot tube (12), and both ends of the rotating shaft (4) are connected to the two pivot heads (22) of the gripping component (2) through the two pivot holes (23) respectively;

the gripping component (2) folds or unfolds relative to the fixed component (1) around the rotating shaft (4);

a locking/unlocking assembly configured to lock and unlock the gripping component (2) in the working position is disposed at one end of the pivot tube (12), and the locking/unlocking assembly comprises a push block (31);

a sleeve (32);

an elastic member (34); and a connecting plate (33) connecting the push block (31) and the sleeve (32);

wherein a portion of the one end of the pivot tube (12) is provided with a sliding groove (13) configured to guide the sliding of the connecting plate (33);

the sleeve (32) is disposed in the pivot tube (12) and sleeved on the rotating shaft (4);

a blocking member is disposed on an inner wall of the pivot tube (12) or on the rotating shaft (4), the elastic member (34) is compressed between the blocking member and the sleeve (32), one end of the elastic member (34) abuts against the blocking member, and the other end of the elastic member (34) abuts against the sleeve (32);

the rotating shaft (4) comprises end portions (41) at both ends and a shaft rod (42) between the two end portions (41), the end portion (41) of the rotating shaft (4) at the one end of the pivot tube (12) where the locking/unlocking assembly is located is configured to be flattened or shaped like a regular polygon;

a shape of a tube hole of the sleeve (32) is consistent with a shape of the end portion (41) of the rotating shaft (4), wherein when the sleeve (32) is sleeved onto the end portion (41) of the rotating shaft (4) under the action of the elastic member (34), the gripping component (2) is locked in the working position, and when the sleeve (32) retracts from the end portion (41) of the rotating shaft (4) against the action of the elastic member (34), the gripping component (2) is unlocked from the working position; and a small circular rod (43) is disposed between the end portion (41) and the shaft rod (42) of the rotating shaft (4); a diameter of an inscribed circle of the sleeve (32) of the locking/unlocking assembly is larger than a diameter of the small circular rod (43) and smaller than a diameter of the shaft rod (42); and the gripping component (2) rotates only when the sleeve (32) retracts from the end portion (41) of the rotating shaft (4) and moves to the small circular rod (43).

2. The foldable gripping structure according to claim 1, wherein the locking/unlocking assembly is configured to lock the gripping component (2) in the working position or in a retracted position, or unlock the gripping component (2) from the working positon or from the retracted at the one end of the pivot tube (12).

3. The foldable gripping structure according to claim 1, further comprising a second locking/unlocking assembly that is disposed at the other end of the two ends of the pivot tube (12), wherein the second locking/unlocking assembly comprises a second push block (31);

a second sleeve (32);

a second elastic member (34); and a second connecting plate (33) connecting the second push block (31) and the second sleeve (32);

wherein a portion of the other end of the pivot tube (12) is provided with a second sliding groove (13) configured to guide the sliding of the second connecting plate (33);

the second sleeve (32) is disposed in the pivot tube (12) and sleeved on the other end of the rotating shaft (4);

a second blocking member is disposed on an inner wall of the pivot tube (12) or on the rotating shaft (4), the second elastic member (34) is compressed between the second blocking member and the second sleeve (32), one end of the second elastic member (34) abuts against the second blocking member, and the other end of the second elastic member (34) abuts against the second sleeve (32);

the other end portion (41) of the rotating shaft (4) where the second locking/unlocking assembly is located is configured to be flattened or shaped like a regular polygon;

a shape of a tube hole of the second sleeve (32) is consistent with a shape of the other end portion (41) of the rotating shaft (4);

when the second sleeve (32) is sleeved onto the other end portion (41) of the rotating shaft (4) under the action of the second elastic member (34), the gripping component (2) is locked in the working position, and when the second sleeve (32) retracts from the other end portion (41) of the rotating shaft (4) against the action of the second elastic member (34), the gripping component (2) is unlocked from the working position.

4. The foldable gripping structure according to claim 1, wherein a shape of the pivot hole (23) of the pivot arm (21)

is consistent with the shape of the end portion (41) of the rotating shaft (4), and the rotating shaft (4) is fixedly connected to the pivot arm (21) through the corresponding end portion (41), and rotates with the rotation of the gripping component (2); and when the gripping component (2) rotates to the working position, the sleeve (32) of the locking/unlocking assembly is sleeved onto the end portion (41) of the rotating shaft (4) under the action of the elastic member (34), and the gripping component (2) is locked in the working position.

5. The foldable gripping structure according to claim 1, wherein the end portion (41) of the rotating shaft (4) is shaped like a regular polygon with edges and corners.

6. The foldable gripping structure according to claim 1, wherein the elastic member (34) is a spring; and the fixed component (1), the gripping component (2), and the locking/unlocking assembly are all made of a metal material.

7. A foldable gripping structure for cooking utensils, comprising a fixed component (1), wherein the fixed component (1) comprises a mounting base (11) and a pivot tube (12) connected to the mounting base (11), and the pivot tube (12) comprises two ends, and a gripping component (2) being rotatably connected to the fixed component (1), wherein the gripping component (2) comprises two pivot arms (21), each of the two pivot arm (21) comprises an end disposed with a pivot head (22), and each of the two pivot heads (22) is provided with a pivot hole (23), wherein the gripping component (2) rotates to a retracted position relative to the fixed component (1) to achieve a folded state and rotates to a working position relative to the fixed component (1) to achieve an unfolded state;

the two pivot heads (22) are respectively located at both the two ends of the pivot tube (12);

a rotating shaft (4) is disposed in the pivot tube (12), and both ends of the rotating shaft (4) are connected to the two pivot heads (22) of the gripping component (2) through the two pivot holes (23) respectively;

the gripping component (2) folds or unfolds relative to the fixed component (1) around the rotating shaft (4);

a locking/unlocking assembly configured to lock and unlock the gripping component (2) in the working position is disposed at one end of the pivot tube (12), limiting blocks (14) protrude outward from end faces of the two ends of the pivot tube (12) and are disposed at the two ends of the pivot tube (12);

correspondingly, each of the two pivot heads (22) of the gripping component (2) is provided with a recessed limiting sliding groove (24), and when the pivot arms (21) are connected to the rotating shaft (4), the limiting blocks (14) are located in the limiting sliding grooves (24);

when the gripping component (2) rotates between the working position and the retracted position, the limiting blocks (14) slide relatively in the limiting sliding grooves (24), and when the gripping component (2) rotates to the working position, the limiting blocks (14) abut against edges of the limiting sliding grooves (24) to prevent further rotation of the gripping component (2).

8. The foldable gripping structure according to claim 7, wherein the limiting blocks (14) are is disposed at a lower portion of the pivot tube (12), and the limiting sliding grooves (23) are correspondingly formed at a lower half portion of the pivot heads (22) when the gripping component (2) is in the working position.

* * * * *